United States Patent
Ravindranath et al.

(10) Patent No.: US 10,216,591 B1
(45) Date of Patent: Feb. 26, 2019

(54) METHOD AND APPARATUS OF A PROFILING ALGORITHM TO QUICKLY DETECT FAULTY DISKS/HBA TO AVOID APPLICATION DISRUPTIONS AND HIGHER LATENCIES

(71) Applicant: EMC Corporation, Hopkinton, MA (US)

(72) Inventors: Anil Ravindranath, Sunnyvale, CA (US); Krishna Gudipati, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 15/198,216

(22) Filed: Jun. 30, 2016

(51) Int. Cl.
*G06F 11/20* (2006.01)
*G06F 11/16* (2006.01)

(52) U.S. Cl.
CPC ...... *G06F 11/2017* (2013.01); *G06F 11/1616* (2013.01); *G06F 2201/85* (2013.01)

(58) Field of Classification Search
CPC ............. G06F 11/0727; G06F 11/0793; G06F 11/076; G06F 11/079; G06F 11/0745; G06F 11/0775; G06F 11/0766; G06F 11/2028; G06F 2201/88; G06F 2201/81
See application file for complete search history.

(56) References Cited

U.S. PATENT DOCUMENTS

| | | | | |
|---|---|---|---|---|
| 6,269,422 | B1* | 7/2001 | McDonald | G11B 15/026 711/111 |
| 7,668,981 | B1* | 2/2010 | Nagineni | H04L 41/0896 710/15 |
| 7,971,093 | B1* | 6/2011 | Goel | G06F 11/004 714/6.22 |
| 8,949,863 | B1* | 2/2015 | Coatney | G06F 11/079 714/43 |
| 9,354,966 | B2* | 5/2016 | Coatney | G06F 11/079 |
| 9,760,419 | B2* | 9/2017 | Zhou | G06F 11/076 |
| 2009/0235123 | A1* | 9/2009 | Oshida | G06F 11/0793 714/43 |
| 2013/0179532 | A1* | 7/2013 | Tanneshige | G06F 11/2033 709/213 |
| 2014/0372698 | A1* | 12/2014 | Lee | G06F 3/06 711/114 |
| 2014/0372789 | A1* | 12/2014 | Arroyo | G06F 11/0712 714/4.5 |
| 2016/0170819 | A1* | 6/2016 | Zhou | G06F 11/076 714/54 |
| 2016/0246663 | A1* | 8/2016 | Coatney | G06F 11/079 |
| 2017/0116097 | A1* | 4/2017 | Keremane | G06F 11/2069 |

* cited by examiner

*Primary Examiner* — Nadeem Iqbal
(74) *Attorney, Agent, or Firm* — Womble Bond Dickinson (US) LLP

(57) ABSTRACT

One embodiment is related to a method for determining a faulty hardware component within a data storage system, comprising: collecting data relating to a plurality of input/output (IO) errors associated with a first storage processor within the data storage system; compiling IO error statistics based on the data relating to the plurality of IO errors; and determining a faulty hardware component based on the IO error statistics, wherein the determining of the faulty hardware component comprises utilizing a second storage processor of the data storage system independent from the first storage processor.

21 Claims, 3 Drawing Sheets

METHOD AND APPARATUS OF A PROFILING ALGORITHM TO QUICKLY DETECT FAULTY DISKS/HBA TO AVOID APPLICATION DISRUPTIONS AND HIGHER LATENCIES

FIELD OF THE INVENTION

The disclosure relates generally to data storage systems and more particularly to troubleshooting within data storage systems.

BACKGROUND

A storage system may comprise one or more storage processors including host bus adapters (HBAs) (referred to collectively as storage processors hereinafter) and one or more Disk Array Enclosures (DAEs). Each DAE may have installed therein one or more disk drives (e.g., hard disk drives or solid-state drives). Some storage systems, referred to hereinafter as dual-channel storage systems, may be equipped with two independent storage processors each. Within a dual-channel storage system, DAEs are chain-connected with two independent paths, each path corresponding to and connected to one of the storage processors. Within each DAE, dual-port disk drives equipped with two ports each are used, and the two ports are connected to the two paths, respectively. Therefore, each storage processor has its own path to access each disk drive. A disk drive responds to an input/output (IO) request with the port through which the request came in.

In the known art the storage processor and connection path redundancies are not being exploited to isolate and identify the faulty hardware component in the event of IO errors. An IO error may be represented by a command timeout. When an IO error occurs, it is generally not known whether it is due to a faulty storage processor, a faulty drive, or a faulty connection such as a faulty cable. Consequently, an application may retry the IO operation on the same potentially faulty path multiple times without success, decreasing application performance due to the latency or even resulting in application downtime.

In case of an IO error, the storage system may try to recover the IO operation by performing a set of error recovery operations (or task management operations). The error recovery operations may include abort task, device reset, target reset, bus reset, and host reset, etc., and are performed in that order unless and until one operation is successful. During the error recovery operations all IO operations to the underlying devices (e.g., the storage processor and the disk drive) are blocked. Even though theses error recovery operations could potentially recover the IO operation that led to an error, the faulty hardware component, if there is one, is not isolated or identified with the error recovery operations. Therefore, if there is a faulty hardware component, future IO errors are still bound to occur.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Figure 1:
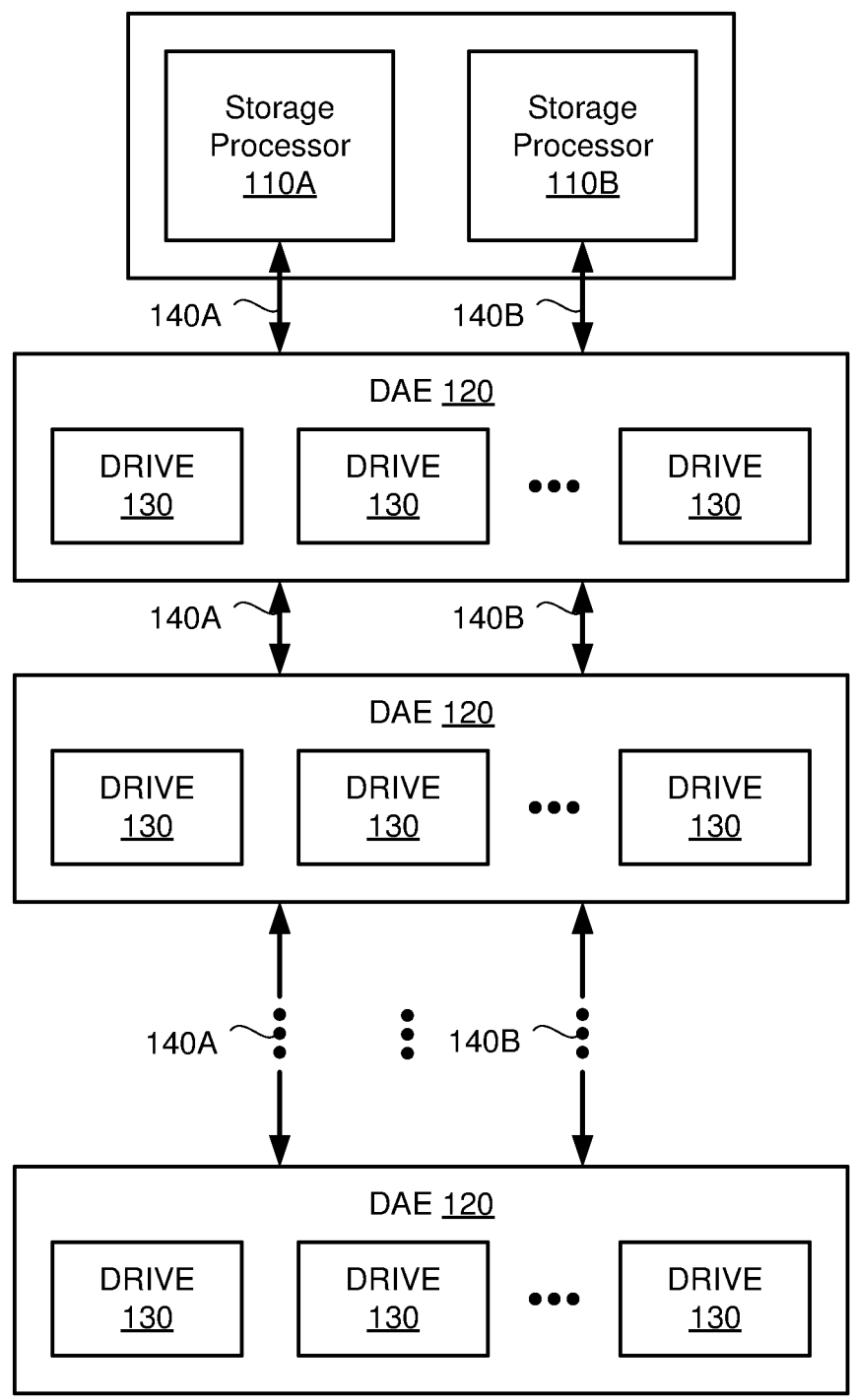
FIG. 1 is a block diagram illustrating an example dual-channel data storage system according to one embodiment of the invention.

Referring to FIG. 1, a block diagram illustrating an example dual-channel storage system 100 according to one embodiment of the invention is shown. The storage system 100 may comprise two storage processors 110A, 110B. The storage system 100 may further comprise one or more DAEs 120. Each DAE 120 may have installed therein one or more dual-port disk drives 130. The DAEs are chain-connected with two independent paths 140A, 140B, each of which corresponds to and is connected to one of the storage processors 110A, 110B, respectively. Within each DAE, each of the two ports (not shown) of each dual-port disk drive 130 is connected to one of the paths 140A, 140B, respectively. Therefore, each storage processor 110A, 110B has a path independent from the other storage processor to access each and every disk drive 130 installed inside all the DAEs 120.

Figure 2:
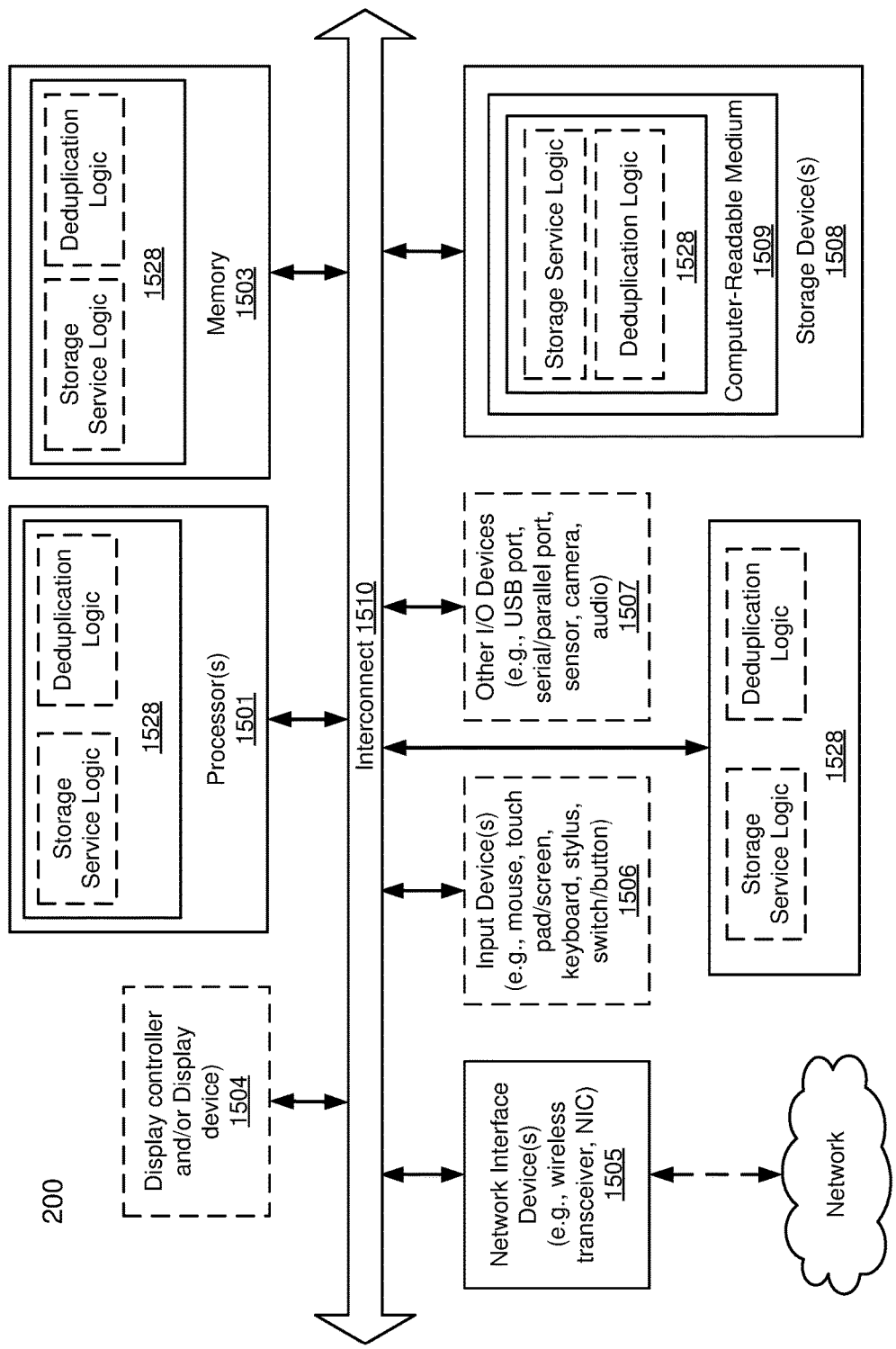
FIG. 2 is a block diagram illustrating an example data processing system according to one embodiment of the invention.

FIG. 2 is a block diagram illustrating an example data processing system 200 according to one embodiment of the invention. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

As described above, in the known art the storage processor 110A, 110B and connection path 140A, 140B redundancies are not being exploited to isolate and identify the faulty hardware component in the event of IO errors. An IO error may be represented by a command timeout. When an IO error occurs, it is generally not known whether it is due to a faulty storage processor 110A, 110B, a faulty drive 130, or a faulty connection such as a faulty cable. Consequently, an application may retry the IO operation on the same potentially faulty path (the path between a particular storage processor 110A, 110B and a particular drive 130) multiple times without success, decreasing application performance due to the latency or even resulting in application downtime.

In case of an IO error, the storage system 100 may try to recover the IO operation by performing a set of error recovery operations (or task management operations). The error recovery operations may include abort task, device reset, target reset, bus reset, and host reset, etc., and are performed in that order unless and until one operation is successful. During the error recovery operations all IO operations to the underlying devices (e.g., the storage processor 110A, 110B, and the disk drive 130) are blocked. Even though theses error recovery operations could potentially recover the IO operation that led to the error, the faulty hardware component, if there is one, is not isolated or identified with the error recovery operations. Therefore, if there is a faulty hardware component, future IO errors are still bound to occur.

Embodiments of the disclosure analyze the IO error statistics and leverage the storage processor 110A, 110B and physical data path 140A, 140B redundancies to determine whether a storage processor 110A, 110B, a drive 130, or a connection is faulty. Furthermore, when a faulty storage processor or a faulty connection is detected, embodiments of the disclosure leverage the storage processor and physical data path redundancies to restore normal data access, thereby reducing service disruption or downtime.

When a storage processor is associated with too many IO errors, and the IO errors are spread across a large number of drives, it may be presumed that the storage processor or its associated physical data path is faulty. On the other hand, if the IO errors are limited to a small number of drives, it is more likely that it is the drives that are faulty. Whether the drives are faulty may be verified by trying to access the same drives with the other storage processor: the drives may be presumed faulty if the IO errors persist. Of course, it is also possible that a large number of drives have become faulty while the storage processor and its associated physical data path are in normal working order. This can also be verified by trying to access the implicated drives with the other storage processor.

Figure 3:
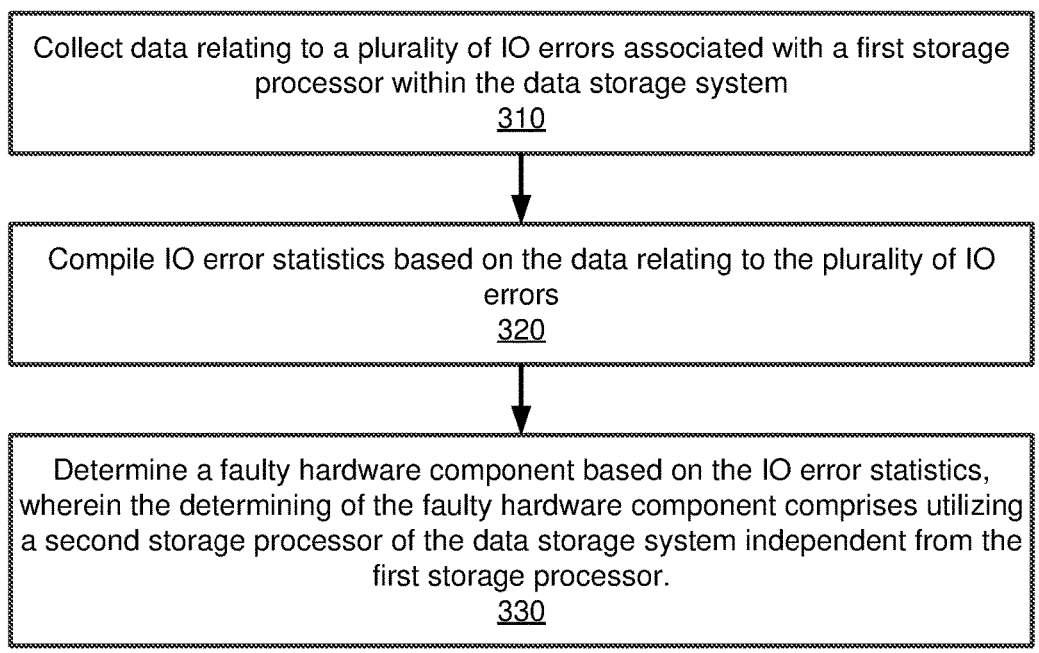
FIG. 3 is a flow diagram illustrating an example method for determining a faulty hardware component within a data storage system according to one embodiment of the invention.

Referring to FIG. 3, a flowchart illustrating an example method 300 for determining a faulty hardware component within a data storage system according to one embodiment of the invention is shown. It should be appreciated that some operations described herein may be optional, and the method may be adapted without deviating from the scope of the disclosure. At block 310, data relating to IO errors associated with a first storage processor within a data storage system may be collected. The data may include such information as the timestamps of the IO errors and the drives associated with the IO errors. At block 320, IO error statistics may be compiled based on the data relating to the IO errors. In one embodiment, the data points of interest are a sufficient number of IO errors that are sufficiently clustered and take place over a sufficient period of time. In other words, if too long a period of time (e.g., above a first time period threshold) has passed since the last IO error, the previous IO errors are no longer of interest. On the other hand, if 1) a sufficient number of IO errors (above a third threshold) 2) take place over a sufficient period of time (above a second time period threshold), and 3) any of the two consecutive IO errors are not too long apart (below the first time period threshold), these IO errors are of interest and the statistics relating to them are further analyzed.

At block 330, a faulty hardware component may be determined based on the IO error statistics, wherein the determining of the faulty hardware component comprises utilizing a second storage processor of the data storage system independent from the first storage processor. Drives that are implicated in the IO errors and the count of IO errors associated with each implicated drive are determined. In one embodiment, a drive has to be associated with a sufficient number (above a fourth threshold) of IO errors to be considered implicated, so as not to unnecessarily implicate a drive due to a random IO error. In one embodiment, whether the drives implicated in the IO errors are faulty may be determined based on whether IO operations can be successfully performed on these drives with the second storage processor and its associated hardware data path: if IO errors persist with the second storage processor, the drives implicated are likely to be faulty; on the other hand, if IO operations can be successfully performed with the second storage processor, the fault more likely lies with the first storage processor and/or its associated physical data path. In another embodiment, whether the drives implicated in the IO errors are faulty may be determined based on the count of drives that are implicated in the IO errors: a small number (below a fifth threshold) indicates that the drives are faulty, while a large number (above a fifth threshold) indicates that the first storage processor and/or its associated physical data path are faulty. Of course, whether the drives are indeed faulty can still be tested with the second storage processor.

In one embodiment, when the IO error statistics indicate that the first storage processor and/or its associated physical data path are faulty, error counters such as Invalid DWord Count, Running Disparity Error Count, and/or Loss of DWord Sync Count may be used to determine whether the fault is attributable to any particular connected entity (or its cable) (a connected entity may comprise, for example, a storage processor or an expander) within the physical data path. In case the expanders support the Serial Attached Small Computer System Interface "SCSI" (SAS) or Serial AT Attachment (SATA) protocol, the above-mentioned error information may be obtained using the Serial Management Protocol (SMP). If, for example, the Invalid DWord Count is above a sixth threshold for a particular connected entity within the physical data path, it may indicate that the entity or its cable is faulty. In any event, once the first storage processor and/or its associated physical data path are determined as faulty, all future IO operations may be switched over to the second storage processor in order to prevent performance degradation.

Method 300 may be performed by processing logic that includes hardware (e.g. circuitry, dedicated logic, etc.), software (e.g., embodied on a non-transitory computer readable medium), or a combination thereof. For example, method 300 may be performed by storage processors 110A, 110B of FIG. 1 and processors 1501 of FIG. 2. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Therefore, one embodiment of the disclosure is related to a method for determining a faulty hardware component within a data storage system, comprising: collecting data relating to a plurality of IO errors associated with a first storage processor within the data storage system; compiling IO error statistics based on the data relating to the plurality of IO errors; and determining a faulty hardware component based on the IO error statistics, wherein the determining of the faulty hardware component comprises utilizing a second storage processor of the data storage system independent from the first storage processor. The data relating to the plurality of IO errors associated with the first storage processor may comprise timestamps of the plurality of IO errors and drives of the data storage system associated with each of the plurality of IO errors. A count of the plurality of IO errors may be above a third threshold; the plurality of IO errors may take place over a period of time longer than a second time period threshold; and a time difference between any two consecutive IO errors within the plurality of IO errors may be below a first time period threshold.

Drives implicated in the plurality of IO errors and a count of IO errors associated with each implicated drive may be determined, wherein each implicated drive is associated with more IO errors than a fourth threshold. The drives implicated in the plurality of IO errors may be determined as faulty based on a fact that 1) IO operations cannot be successfully performed on them with the second storage processor, 2) a count of the drives implicated in the plurality of IO errors is below a fifth threshold, or a combination of both. The first storage processor or its associated hardware data path may be determined as faulty based on a fact that 1) a count of the drives implicated in the plurality of IO errors is above a fifth threshold, 2) the first storage processor or at least one connected entity within the hardware data path is associated with an error count above a sixth threshold, or a combination of both, wherein the error count is one of Invalid DWord Count, Running Disparity Error Count, or Loss of DWord Sync Count. All future IO operations may be switched to the second storage processor in response to the first storage processor or its associated hardware data path having been determined as faulty.

One embodiment of the disclosure is related to a data processing system, comprising: a processor; and a memory coupled to the processor storing instructions which, when executed by the processor, cause the processor to perform troubleshooting operations, the operations including: collecting data relating to a plurality of IO errors associated with a first storage processor within the data processing system; compiling IO error statistics based on the data relating to the plurality of IO errors; and determining a faulty hardware component based on the IO error statistics, wherein the determining of the faulty hardware component comprises utilizing a second storage processor of the data processing system independent from the first storage processor.

By utilizing embodiments of the disclosure described herein, the second storage processor may be leveraged in the attempt to troubleshoot IO errors associated with the first storage processor based on IO error statistics. The faulty hardware component may be located and replaced or temporarily bypassed, thereby preventing service degradation or downtime.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for determining a faulty hardware component within a data storage system, comprising:
    collecting, by a processor, data relating to a plurality of input/output (IO) errors associated with a first storage processor within the data storage system, wherein the data storage system includes a plurality of disk array enclosures (DAEs), each DAE having one or more disk drives;
    compiling, by the processor, IO error statistics based on the data relating to the plurality of IO errors, the IO error statistics being related to a first one of the DAEs of the data storage system; and
    determining, by the processor, a faulty hardware component based on the IO error statistics, wherein the determining of the faulty hardware component comprises utilizing a second storage processor of the data storage system independent from the first storage processor, including examining IO access statistics of the second storage processor for accessing the first DAE through a different path, and
    wherein the plurality of DAEs are connected to the first storage processor and the second storage processor through an independent first path and an independent second path, and each of the one or more disk drives has a first port connected to the first storage processor through the first path and a second port connected to the second storage processor through the second path.

2. The method of claim 1, wherein the data relating to the plurality of IO errors associated with the first storage processor comprise timestamps of the plurality of IO errors and drives of the data storage system associated with each of the plurality of IO errors.

3. The method of claim 1, wherein a count of the plurality of IO errors is above a third threshold, the plurality of IO errors take place over a period of time longer than a second time period threshold, and a time difference between any two consecutive IO errors within the plurality of IO errors is below a first time period threshold.

4. The method of claim 1, further comprising:
    determining drives implicated in the plurality of IO errors and a count of IO errors associated with each implicated drive, wherein each implicated drive is associated with more IO errors than a fourth threshold.

5. The method of claim 4, further comprising:
    determining the drives implicated in the plurality of IO errors as faulty based on a fact that 1) IO operations cannot be successfully performed on the drives implicated in the plurality of IO errors with the second storage processor, 2) a count of the drives implicated in the plurality of IO errors is below a fifth threshold, or a combination of both.

6. The method of claim 4, further comprising:
    determining the first storage processor or its associated hardware data path as faulty based on a fact that 1) a count of the drives implicated in the plurality of IO errors is above a fifth threshold, 2) the first storage processor or at least one connected entity within the hardware data path is associated with an error count above a sixth threshold, or a combination of both, wherein the error count is one of Invalid DWord Count, Running Disparity Error Count, or Loss of DWord Sync Count.

7. The method of claim 6, further comprising:
    switching all future IO operations to the second storage processor in response to the first storage processor or its associated hardware data path having been determined as faulty.

8. A non-transitory machine-readable medium having instructions stored therein which, when executed by a processor, cause the processor to perform troubleshooting operations, the operations comprising:
    collecting data relating to a plurality of input/output (IO) errors associated with a first storage processor within a data storage system, wherein the data storage system includes a plurality of disk array enclosures (DAEs), each DAE having one or more disk drives;
    compiling IO error statistics based on the data relating to the plurality of IO errors, the IO error statistics being related to a first one of the DAEs of the data storage system; and
    determining a faulty hardware component based on the IO error statistics, wherein the determining of the faulty hardware component comprises utilizing a second storage processor of the data storage system independent from the first storage processor, including examining IO access statistics of the second storage processor for accessing the first DAE through a different path, and
    wherein the plurality of DAEs are connected to the first storage processor and the second storage processor through an independent first path and an independent second path, and each of the one or more disk drives has a first port connected to the first storage processor through the first path and a second port connected to the second storage processor through the second path.

9. The non-transitory machine-readable medium of claim 8, wherein the data relating to the plurality of IO errors associated with the first storage processor comprise timestamps of the plurality of IO errors and drives of the data storage system associated with each of the plurality of IO errors.

10. The non-transitory machine-readable medium of claim 8, wherein a count of the plurality of IO errors is above a third threshold, the plurality of IO errors take place over a period of time longer than a second time period threshold, and a time difference between any two consecutive IO errors within the plurality of IO errors is below a first time period threshold.

11. The non-transitory machine-readable medium of claim 8, the operations further comprising:
   determining drives implicated in the plurality of IO errors and a count of IO errors associated with each implicated drive, wherein each implicated drive is associated with more IO errors than a fourth threshold.

12. The non-transitory machine-readable medium of claim 11, the operations further comprising:
   determining the drives implicated in the plurality of IO errors as faulty based on a fact that 1) IO operations cannot be successfully performed on the drives implicated in the plurality of IO errors with the second storage processor, 2) a count of the drives implicated in the plurality of IO errors is below a fifth threshold, or a combination of both.

13. The non-transitory machine-readable medium of claim 11, the operations further comprising:
   determining the first storage processor or its associated hardware data path as faulty based on a fact that 1) a count of the drives implicated in the plurality of IO errors is above a fifth threshold, 2) the first storage processor or at least one connected entity within the hardware data path is associated with an error count above a sixth threshold, or a combination of both, wherein the error count is one of Invalid DWord Count, Running Disparity Error Count, or Loss of DWord Sync Count.

14. The non-transitory machine-readable medium of claim 13, the operations further comprising:
   switching all future IO operations to the second storage processor in response to the first storage processor or its associated hardware data path having been determined as faulty.

15. A data processing system, comprising:
   a processor; and
   a memory coupled to the processor storing instructions which, when executed by the processor, cause the processor to perform troubleshooting operations, the operations including
   collecting data relating to a plurality of input/output (IO) errors associated with a first storage processor within the data processing system, wherein the data storage system includes a plurality of disk array enclosures (DAEs), each DAE having one or more disk drives;
   compiling IO error statistics based on the data relating to the plurality of IO errors, the IO error statistics being related to a first one of the DAEs of the data storage system; and
   determining a faulty hardware component based on the IO error statistics, wherein the determining of the faulty hardware component comprises utilizing a second storage processor of the data processing system independent from the first storage processor, including examining IO access statistics of the second storage processor for accessing the first DAE through a path, and
   wherein the plurality of DAEs are connected to the first storage processor and the second storage processor through an independent first path and an independent second path, and each of the one or more disk drives has a first port connected to the first storage processor through the first path and a second port connected to the second storage processor through the second path.

16. The system of claim 15, wherein the data relating to the plurality of IO errors associated with the first storage processor comprise timestamps of the plurality of IO errors and drives of the data processing system associated with each of the plurality of IO errors.

17. The system of claim 15, wherein a count of the plurality of IO errors is above a third threshold, the plurality of IO errors take place over a period of time longer than a second time period threshold, and a time difference between any two consecutive IO errors within the plurality of IO errors is below a first time period threshold.

18. The system of claim 15, the operations further comprising:
   determining drives implicated in the plurality of IO errors and a count of IO errors associated with each implicated drive, wherein each implicated drive is associated with more IO errors than a fourth threshold.

19. The system of claim 18, the operations further comprising:
   determining the drives implicated in the plurality of IO errors as faulty based on a fact that 1) IO operations cannot be successfully performed on the drives implicated in the plurality of IO errors with the second storage processor, 2) a count of the drives implicated in the plurality of IO errors is below a fifth threshold, or a combination of both.

20. The system of claim 18, the operations further comprising:
   determining the first storage processor or its associated hardware data path as faulty based on a fact that 1) a count of the drives implicated in the plurality of IO errors is above a fifth threshold, 2) the first storage processor or at least one connected entity within the hardware data path is associated with an error count above a sixth threshold, or a combination of both, wherein the error count is one of Invalid DWord Count, Running Disparity Error Count, or Loss of DWord Sync Count.

21. The system of claim 20, the operations further comprising:
   switching all future IO operations to the second storage processor in response to the first storage processor or its associated hardware data path having been determined as faulty.

* * * * *